United States Patent [19]

Stemme et al.

[11] 4,194,821

[45] Mar. 25, 1980

[54] CAMERA WITH FILM-UNIT DRIVE

[75] Inventors: Otto Stemme, München; Peter Lermann, Narring; Gunter Fauth, Unterhaching, all of Fed. Rep. of Germany

[73] Assignee: Agfa-Gevaert Aktiengesellschaft, Leverkusen, Fed. Rep. of Germany

[21] Appl. No.: 964,801

[22] Filed: Nov. 28, 1978

[30] Foreign Application Priority Data

Dec. 1, 1977 [DE] Fed. Rep. of Germany ....... 2753627

[51] Int. Cl.² .................... G03B 1/00; G03B 17/50
[52] U.S. Cl. ........................................ 354/86; 354/212
[58] Field of Search ..................... 354/83–86, 354/152, 153, 156, 170, 173, 212

[56] References Cited

U.S. PATENT DOCUMENTS

| 3,426,664 | 2/1969 | Norton | 354/86 |
| 3,906,527 | 9/1975 | Erlichman | 354/85 X |

Primary Examiner—L. T. Hix
Assistant Examiner—Thomas H. Tarcza
Attorney, Agent, or Firm—Michael J. Striker

[57] ABSTRACT

A camera has a pair of nip rollers which are rotated by a toothed belt via gears. Function-controlling elements mounted on the camera are operated when the belt moves.

5 Claims, 3 Drawing Figures

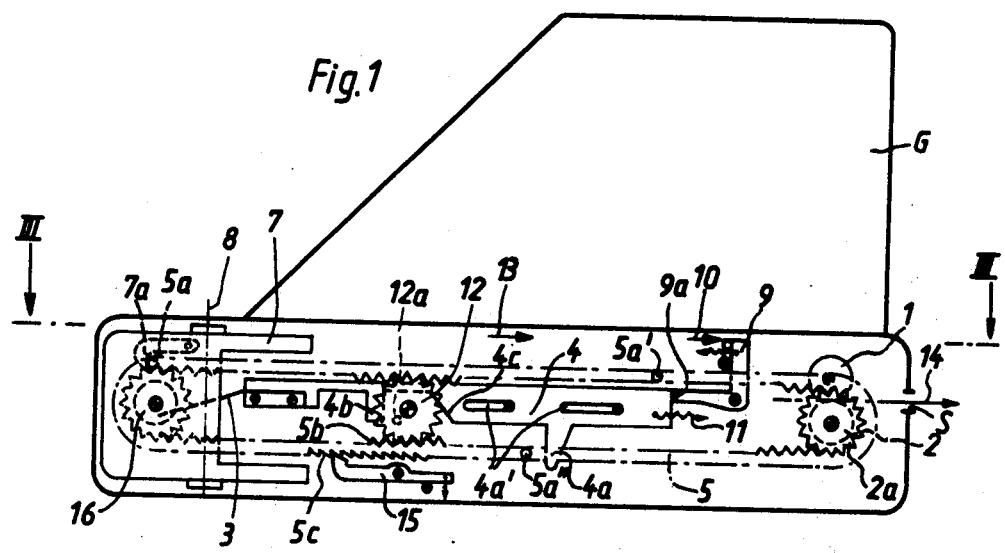
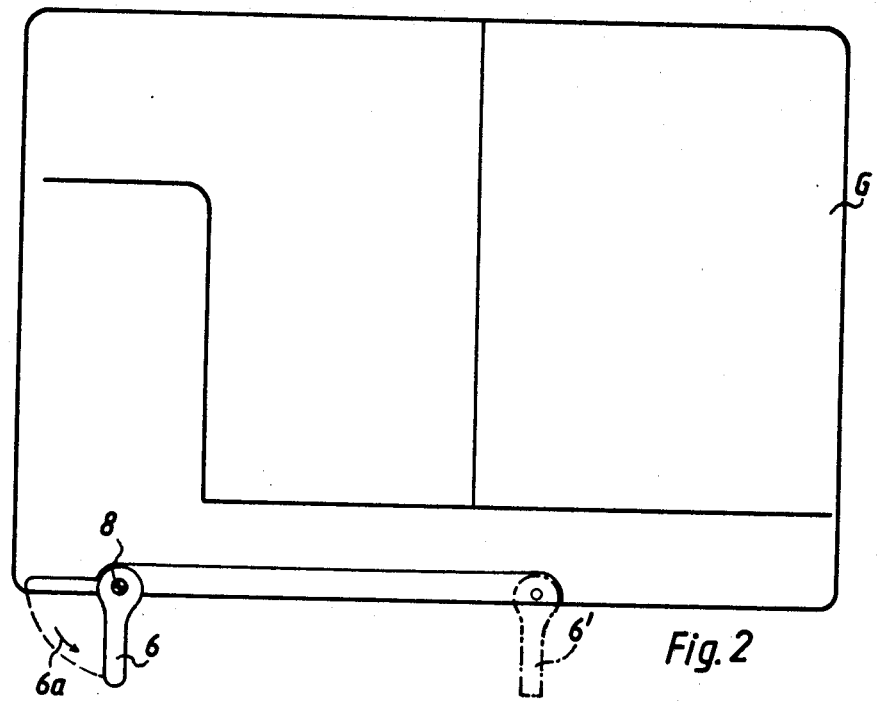

CAMERA WITH FILM-UNIT DRIVE

BACKGROUND OF THE INVENTION

1. Field of the Invention

This invention relates to photographic apparatus.

More particularly, the invention relates to an auto-processing (instant picture) camera.

2. The Prior Art

In self-processing cameras the film is present in form of a stack of film sheets or film units contained in a cassette which is insertable into the camera housing. Photographs are taken by exposing the respectively uppermost film sheet of the stack and then making the same travel through the nip defined between two developing and transporting rollers which squeeze developer fluid from a pouch of the film sheet and spread it over the picture area. A drive is provided for rotating the rollers and the uppermost film sheet of the stack is withdrawn from the cassette and fed to the nip between the rollers by a film pick or gripper.

Generally, for example in U.S. Pat. Nos. 3,936,847 and 3,889,280, toothed belt is used to transmit motive power from the drive to the rollers. Various camera functions are controlled by cams or gears which are driven by the drive (e.g., motor) or the belt.

SUMMARY OF THE INVENTION

It is an object of the present invention to provide improvement over the prior art.

More particularly, it is an object to provide a camera wherein various camera functions are controlled in a simpler, less complicated and less expensive manner than before.

Another object is to provide a camera of the type under discussion which can be operated manually and with great ease.

In keeping with the above objects and with still others which will become apparent hereafter, one feature of the invention resides in a camera which, briefly stated, may comprise a pair of nip rollers; a film transporting member for moving film into the nip of the rollers; gear means including at least one gear coupled with one of the rollers for joint rotation therewith; an internally toothed belt trained about the gear means in motion-transmitting relationship therewith; camera-mounted function controlling elements; input means operatively connected with the belt for advancing the same in a predetermined direction and thereby turning the gear means; and means on the belt for operating at least some of the function controlling elements during advancement of the belt.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic section through a camera embodying the present invention;

FIG. 2 is a simplified top plan view of the camera in FIG. 1; and

DESCRIPTION OF THE PREFERRED EMBODIMENTS

Figure 3:
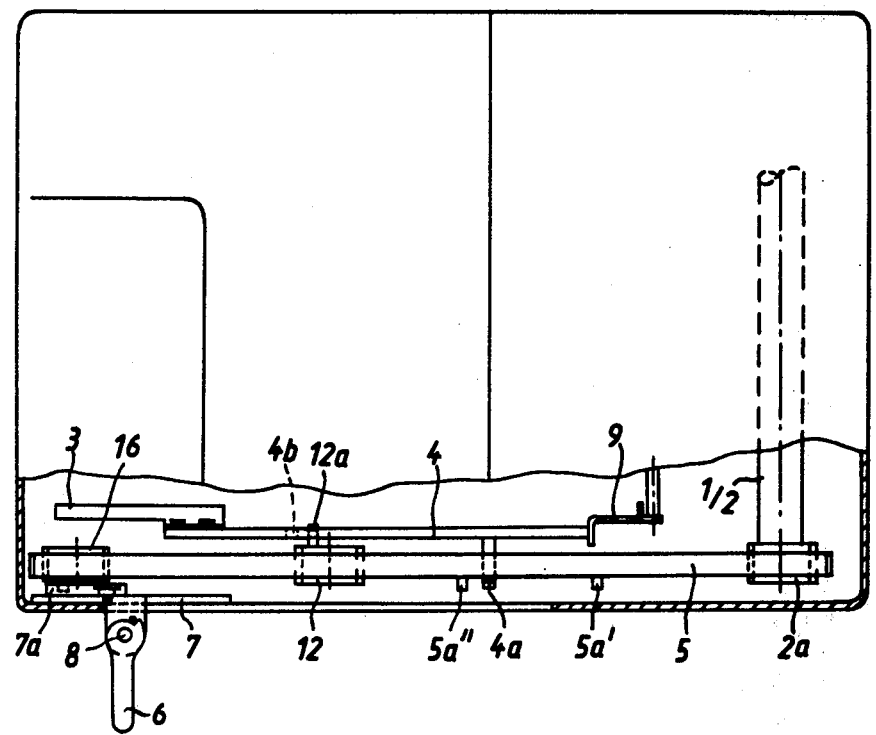
FIG. 3 is a section on line III—III of FIG. 1.

The drawing illustrates in FIGS. 1-3 a single embodiment of the invention, by way of a non-limiting example. The camera shown in these FIGS. will be seen to have a diagrammatically illustrated housing G which, obviously, need not have the illustrated shape. Mounted in the housing G, inwardly of an outlet slot S thereof, are two rollers 1 and 2 which together form a nip through which a film sheet (not shown) must pass in the direction of arrow 14 to be developed and expelled from the camera. The rollers 1, 2 thus serve (in the manner known per se) as the developer spreaders and film-sheet transporters of the camera.

The camera has a film chamber (not shown) into which a cassette containing a stack of self-processing film sheets (not shown) is insertable, so that one end of the cassette is located adjacent to (in FIG. 1 to the left of) the rollers 1, 2. The respectively uppermost film sheet of the stack is, after exposure has been made, engaged and shifted towards the rollers 1, 2 by a gripper or film pick 3 which is known per se. The gripper 3 is provided on a slide 4 which is mounted in the housing G by means of pin-and-slot connections 4a permitting it to be shifted to the right and to the left in FIG. 1.

One of the rollers, here the roller 2, carries on its one axial end (or is rigidly connected with) a gear 2a. At the opposite end of the housing from the rollers 1, 2 there is mounted a freely turnable further gear 16. A belt 5 having inner teeth 5b is trained about the gears 2a, 16 so that the same mesh with the teeth 5b and are thus connected in motion-transmitting relationship. The belt 5 is further provided on its outer surface with additional teeth 5c (only some shown) and with a plurality (here three) of laterally extending projections 5a, 5a', 5a"- which are equally spaced along the belt 5.

Another gear 12 is freely turnable mounted on the housing G intermediate the gears 2a, 16 and extends into the space between the two runs of the belt 5, so that is meshes with the teeth 5b of both runs. One axial end of gear 12 provided with an axially extending eccentric pin or projection 12a.

The slide 4 has a portion 4b provided with the illustrated abutment faces and another such face 4c, as well as having the illustrated projections 4a. The slide is mounted in the housing G so that it can move behind (i.e., axially adjacent to) that axial end of the gear 12 which has the pin 12a. The projection 4a extends laterally of the lower run of belt 5, close enough to the same to be engaged by the projections 5a, 5a' and 5a", respectively.

Another slide 7 is mounted on the inner housing wall and provided with a spring-biased pawl 7a which is positioned so that it also can engage with the projections 5a, 5a' and 5a". An operating member 6 is connected to the slide 7 via a pivot axis 8; it extends outside the housing G and can be pivoted against the same and also away from the same, as shown by the arrow 6a. When the member 6 is pivoted away from the housing G to its operative position, pressure exerted upon it by a user causes the member 6 and the slide 7 to jointly move to the brokenline position 6' (FIG. 2).

The slide 4 is shown in its rest (non-operated) position in the drawing. It is held in this position against the urging (rightward in FIG. 1) of a biasing spring 11, by a pawl 9 which is mounted on the housing laterally of the slide 4 and which holds the slide in the rest position by engaging the adjacent axial end of the slide 4 with a portion 9a which is angled off with respect to the main part of the pawl (in FIG. 1 towards the viewer).

The Operation

On release of the camera shutter (not shown because known per se) the shutter-closing member (or the shutter release button or analogous element) cooperates with the pawl 9 in manner known per se, to pivot the pawl in the direction of the arrow 10. This disengages the portion 9a from the slide 4, so that the spring 11 can now pull the slide towards the slot S (i.e., rightwards in FIG. 1). The film gripper 3 moves with the slide 4 until it engages the trailing edge (i.e., the one distal from slot S) of the uppermost film sheet. During this movement the portion 4b travels past the gear 12, until its trailing (leftward) abutment face becomes located to the right (in FIG. 1) of the pin 12a. This is possible, despite the fact that pin 12a projects into the path of movement of the portion 4b, because the linear movement of portion 4b and the circular movement of pin 12a are so correlated that the pin 12a will be located below the lower edge of portion 4b while the same travels past the gear 12, and will move upwards behind the trailing abutment face (and into the path of portion 4b) after the same has passed it.

The user now grips the member 6 (after first pivoting it in the direction of arrow 6a, if necessary) and pushes or pulls it to the right (FIG. 2), i.e., towards the slot S. This causes the slide 7 to be shifted in the same direction; since slide 7 is coupled to belt 5 by pawl 7a, it also entrains the belt 5 in the direction of arrow 13. Reverse movement of the belt is prevented by the pawl 15 which ratchets over the teeth 5c when belt 5 moves in direction of the arrow 13, but blockingly engages these teeth if the belt tries to reverse its movement.

During this advancement of the belt 5 the pin 12a abuts against the trailing face of the portion 4b and thus entrains the slide 4, causing the same to be shifted farther to the right and to pull (via gripper 3) the uppermost film sheet from the cassette and into the nip between rollers 1 and 2. At the end of its rightward movement the slide 4 is held in position by the spring 11 and the trailing (left) face of the portion 4b has moved rightwards beyond the circular path of movement of the pin 12a, so that the gear 12 can turn freely.

During the advancement of belt 5 in direction of the arrow 13 the roller 2 is turned, since belt 5 transmits motion to it via gear 2a. On entry of the leading (rightmost) end of the film sheet (not shown) into the nip between the rollers 1, 2, these rollers transport the film sheet out of the camera in the direction of arrow 14. Shortly before the end of this transportation movement is reached the projection 5a' of belt 5 engages the projection 4a (which, due to the displacement of slide 4 is located farther to the right at this time than in FIG. 1) and moves the slide 4 back to its starting position (shown in FIG. 1) against the urging of spring 11. The pawl 9 snaps behind the slide 4 before the transporting movement of belt 5 is quite finished; therefore, the projection 5a' moves past the projection 4a (which it can do because the belt 5 can elastically yield to the now stationary portion 4a) and assumes the position which is shown in FIG. 1 for projection 5a''. The latter, of course, has meanwhile moved to the position which in FIG. 1 is indicated for the projection 5a. Therefore, return movement of the member 6 from the broken-line to the solid-line position with a concomitant return of the slide 7, results in the pawl 7a engaging behind the projection 5a'' so that the camera is now ready for the next exposure.

It will be understood that the invention disclosed by way of the illustrated embodiment is susceptible of a variety of modifications. For example, the slide 7 and member 6 could be omitted and one of the gears 12 or 16 could be positively driven instead. Such driving could be effected via a handcrank, a spring motor or an electric motor. What counts is that the slide 4 be controlled from the belt 5 via the portions 4a, 4b. The belt 5 could itself be replaced with a tape or web of metal or synthetic plastic material and which is provided with one or more longitudinally extending lines of perforations in lieu of the belt teeth 5b; the gears 2a, 12 and 16 would then be so constructed (e.g., as sprockets) as to engage in these perforations. Such a tape or web could have one of its lateral edges provided with serrations corresponding to (and having the same purpose as) the teeth 5c and its other lateral edge would have the projections 5a, 5a' and 5a''. Also, the number of these projections 5a, 5a' and 5a'' need not, in any of the various embodiments, be identical with the number shown in the illustrated example.

While the invention has been illustrated and described as embodied in an auto-processing camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a camera, particularly in an instant picture camera, a combination comprising a pair of nip rollers; a film transporting member for moving film into the nip of said rollers; gear means, including at least one gear coupled with one of said rollers for joint rotation therewith; an internally toothed belt trained about said gear means in motiontransmitting relationship therewith; camera-mounted functioncontrolling elements; input means operatively connected with said belt for advancing the same in a predetermined direction and thereby turning said gear means; a slide mounted for movement in and opposite to said direction, said input means including a handle coupled to said slide and accessible to a user for effecting the movement of said slide; and operating means on said belt for operating at least some of said function controlling elements during advancement of the belt, including at least one projection engageable by said slide during movement thereof in said direction.

2. A combination as defined in claim 1, said operating means comprising a plurality of additional portions spaced along said belt in predetermined increments said operative for operating said at least one function-controlling element in response to advancement of the belt through a distance corresponding to a respective one of said increments.

3. A combination as defined in claim 2, wherein said additional portions are also projections on a surface of said belt.

4. A combination as defined in claim 2, wherein said additional portions are recesses in a surface of said belt.

5. A combination as defined in claim 2, one of said function-controlling elements being a cameramounted pawl; and wherein some of said operating portions are teeth provided on an outwardly directed surface of the belt and cooperating with said pawl and permitting advancement of said belt only in said predetermined direction.

* * * * *